(12) United States Patent
Savoj et al.

(10) Patent No.: US 9,292,782 B2
(45) Date of Patent: Mar. 22, 2016

(54) ADAPTIVE NFC TRANSCEIVERS

(75) Inventors: Jafar Savoj, Sunnyvale, CA (US); Angelica Wong, Palo Alto, CA (US)

(73) Assignee: Qualcomm Incorporated, San Diego, CA (US)

( * ) Notice: Subject to any disclaimer, the term of this patent is extended or adjusted under 35 U.S.C. 154(b) by 145 days.

(21) Appl. No.: 13/282,349

(22) Filed: Oct. 26, 2011

(65) Prior Publication Data

US 2013/0109305 A1    May 2, 2013

(51) Int. Cl.
*G06K 19/077* (2006.01)
*G06K 7/00* (2006.01)

(52) U.S. Cl.
CPC ........ *G06K 19/07749* (2013.01); *G06K 7/0008* (2013.01)

(58) Field of Classification Search
CPC .......... H04B 1/0458; H03C 1/08; H03H 7/40; H03H 11/30; H03H 7/0123; H03H 7/38; H03H 11/28; H03H 2007/386; H03H 1/56; H01L 2924/3011; G06K 19/07749
USPC ....................................................... 455/41.1
See application file for complete search history.

(56) References Cited

U.S. PATENT DOCUMENTS

| | | | |
|---|---|---|---|
| 6,036,055 A | 3/2000 | Mogadam et al. | |
| 6,070,803 A | 6/2000 | Stobbe | |
| 6,650,227 B1 | 11/2003 | Bradin | |
| 7,113,139 B2 | 9/2006 | Charrat | |
| 7,439,860 B2 | 10/2008 | Andresky | |
| 7,539,465 B2 | 5/2009 | Quan | |
| 7,583,179 B2 * | 9/2009 | Wu et al. | 340/10.1 |
| 7,917,115 B2 * | 3/2011 | Baker | 455/277.1 |
| 2006/0186995 A1 * | 8/2006 | Wu et al. | 340/10.1 |
| 2006/0267688 A1 * | 11/2006 | Tanoue et al. | 330/278 |
| 2008/0106349 A1 * | 5/2008 | McKinzie | 333/17.3 |
| 2008/0233890 A1 * | 9/2008 | Baker | 455/73 |
| 2009/0058657 A1 * | 3/2009 | Tuttle | 340/572.7 |
| 2009/0280753 A1 * | 11/2009 | Philip et al. | 455/77 |
| 2009/0322475 A1 | 12/2009 | Uno et al. | |
| 2010/0109445 A1 * | 5/2010 | Kurs et al. | 307/104 |
| 2010/0308933 A1 * | 12/2010 | See et al. | 333/32 |
| 2011/0127954 A1 | 6/2011 | Walley et al. | |
| 2011/0248673 A1 * | 10/2011 | Aerts et al. | 320/108 |
| 2012/0049937 A1 * | 3/2012 | El Waffaoui | 327/536 |
| 2012/0083205 A1 * | 4/2012 | Marcu et al. | 455/41.1 |

FOREIGN PATENT DOCUMENTS

| | | |
|---|---|---|
| EP | 1909384 A2 | 4/2008 |
| JP | 57183135 A | 11/1982 |

OTHER PUBLICATIONS

International Search Report and Written Opinion—PCT/US2012/062271—ISA/EPO—May 3, 2013.
Partial International Search Report—PCT/US2012/062271—ISA/EPO—Feb. 4, 2013.

* cited by examiner

*Primary Examiner* — Bobbak Safaipour
*Assistant Examiner* — Devan Sandiford
(74) *Attorney, Agent, or Firm* — Joseph Hanasz

(57) ABSTRACT

Exemplary embodiments are directed to a transceiver having an adaptive matching circuit. A transceiver may include a matching circuit that is coupled to an antenna and includes an adjustable capacitor. The transceiver may further include an envelope detector coupled to the antenna and a sensor for sensing a voltage at an output of the envelope detector.

16 Claims, 14 Drawing Sheets

US 9,292,782 B2

ADAPTIVE NFC TRANSCEIVERS

BACKGROUND

1. Field

The present invention relates generally to near field communication (NFC). More specifically, the present invention relates to NFC transceivers including adaptive antenna matching circuitry.

2. Background

Near Field Communication (NFC) is wireless technology that can enable for short range exchange of information between two or more devices. Devices capable of NFC can simplify presence-oriented transactions to enable for rapid and more secure exchange of information, for example, as in purchases for goods and services, or the exchange of information therein.

As a person skilled in the art will appreciate and understand, NFC technologies communicate over magnetic field induction, where at least two loop antennas are located within each other's "near field," effectively forming an air-core transformer that operates within a globally available and unlicensed radio frequency which, as indicated, is an industrial, scientific and medical (ISM) band of 13.56 MHz, with a band width of almost two (2) MHz.

Use of Near Field Communication (NFC) technology is steadily increasing. Further, mobile telephones, which differ in shape and size, are becoming smaller and smaller. Additionally, mobile telephones are required to include one or more antennas, which have to fit within the mobile telephone. Accordingly, standardized NFC antenna designs are not a valid option. As a result, non-standardized antennas may have varying characteristics, such as inductance and resistance. Current NFC transmission modules may require antenna circuitry, which is to be manually matched with the integrated circuit (IC) to maximize the power of the emitted RF (radio frequency) field. Therefore, the range of the transmission module may be increased and the quality of the transmitted signal may be enhanced. Manual matching of the antenna characteristics is a rather lengthy and complicated procedure. Further, long-range RFID readers may utilize automatic matching means that use large non-integrable components to achieve proper tuning. However, this is not a valid option for mobile NFC transceivers. A need exists for methods, systems, and devices related to adaptive calibration circuitry for NFC transceivers. More specifically, a need exists for adaptive matching circuits, and associated methods, for providing optimal performance for varying antenna structures and parts.

DETAILED DESCRIPTION

Figure 1:
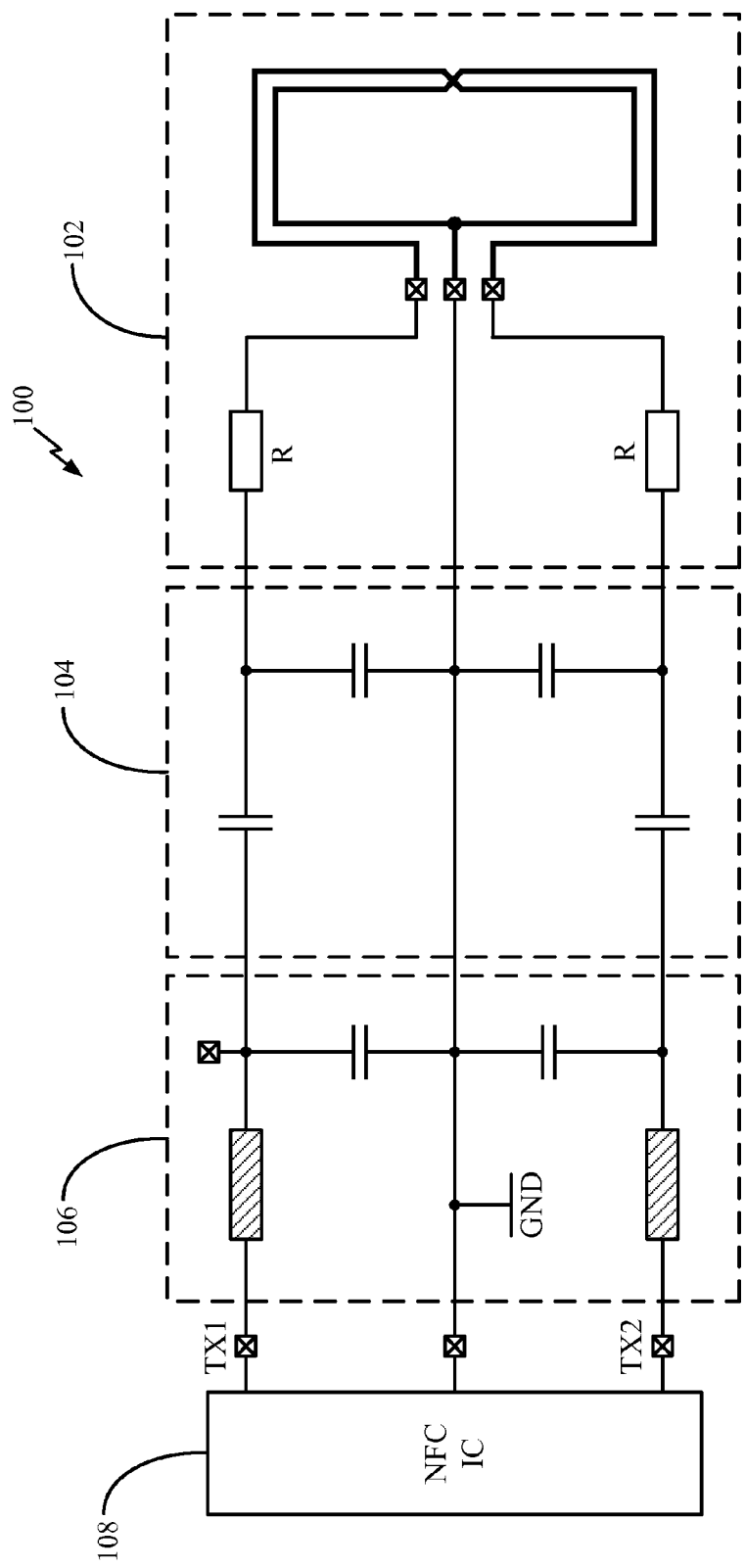
FIG. 1 illustrates a conventional NFC system.

The detailed description set forth below in connection with the appended drawings is intended as a description of exemplary embodiments of the present invention and is not intended to represent the only embodiments in which the present invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, well-known structures and devices are shown in block diagram form in order to avoid obscuring the novelty of the exemplary embodiments presented herein.

NFC is a communication standard that enables wireless communication devices, such as cellular telephones, SmartPhones, and personal digital assistants (PDAs) to establish peer-to-peer (P2P) networks. NFC may enable electronic devices to exchange data and initiate applications automatically when they are brought in close proximity, for example ranges from less than a centimeter to a distance of about 10 cm. As non-limiting examples, NFC may enable downloading of images stored in a digital camera to a personal computer, downloading of audio and video entertainment to portable devices, or downloading of data stored in a SmartPhone to a personal computer or other wireless device. NFC may be compatible with smart card technologies and may also be utilized to enable purchase of goods and services. In an exemplary embodiment, the frequency used for NFC is centered at about 13.56 MHz.

An NFC transceiver may include circuitry to impedance match to an antenna or other circuitry within a coupling element. The NFC transceiver may also include suitable logic, circuitry, processors, code, or combinations thereof to enable the reception and transmission of NFC signals, for which the carrier frequency of the received signal is in the NFC frequency band. Data may be modulated on the carrier frequency.

Conventional NFC may be based on Radio-Frequency Identification (RFID) technology that uses field induction to enable communication between electronic devices in close proximity. This can enable users to perform intuitive, safe, contactless transactions. Conventional state-of-the art NFC may operate at 13.56 MHz and transfers data at up to 424 Kbits/second. Of course, improvements to NFC technology may result in differing frequency(s), differing throughput values, or both. Communication between two or more NFC-compatible devices may occur when the devices are brought within a short distance from one another and maybe compatible with other known wireless technologies such as Bluetooth or Wi-Fi, for example.

Currently, there are two principal modes of operation available under present NFC standards: active and passive (i.e., powered by field). In active mode, a device may generate its own radio field to transmit data. In passive mode, one device may generate a radio field, while the other uses load modulation to transfer data. The passive mode of communication is often useful for limited power devices, such as mobile phones and PDAs, which need to minimize energy use. It may also prevent disruption of NFC communication when the device battery runs out.

In the various exemplary embodiments described herein, the term NFC is understood to encompass any now or future known wireless or near-proximity communication protocols or systems that facilitate the short-range wireless transfer of information, and is understood to not be limited to current standards or protocols promulgated by an NFC standards body or organization. Accordingly, NFC is understood to be applied herein as a generic sense of the term.

As will be understood by a person having ordinary skill in the art, NFC tags may utilize an antenna, which has an inductance that varies significantly. Further, depending on the use, mutual inductance of a handshaking device may vary the effective inductance of the host device.

FIG. 1 is an illustration of a conventional NFC antenna topology 100 configured for manual tuning Antenna topology 100 includes an EMC filter 106, a matching circuit 104, and an antenna 102. EMC filter 106 reduces undesired harmonics of the carrier. Matching circuit 104 includes a plurality of capacitors to perform the actual tuning and antenna 102 includes quality factor damping resistors R. Antenna topology further includes an NFC integrated circuit 108. In operation, the reflection coefficient of the antenna circuitry (i.e., at TX1 and TX2) is measured and, thereafter, capacitors within matching circuit 104 may be adjusted to achieve a desired matching. As will be appreciated by a person having ordinary skill in the art, manual tuning is an extensive process and requires proper capacitors values. Further, equipment, such as a network analyzer or an impedance analyzer, which are expensive, may be needed.

Figure 2:
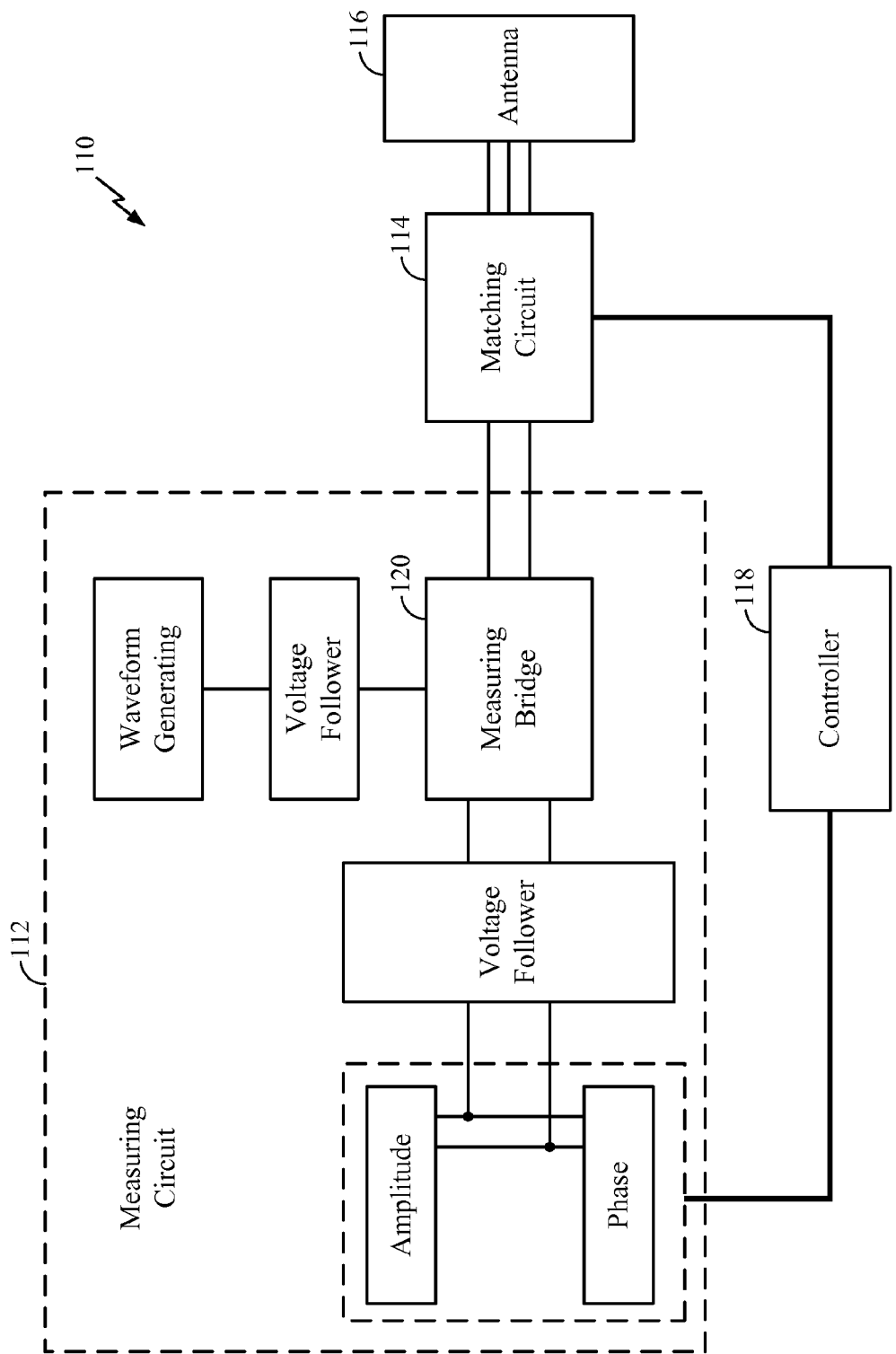
FIG. 2 illustrates a prior art device for calibration of a matching network for an antenna.
Figure 3:
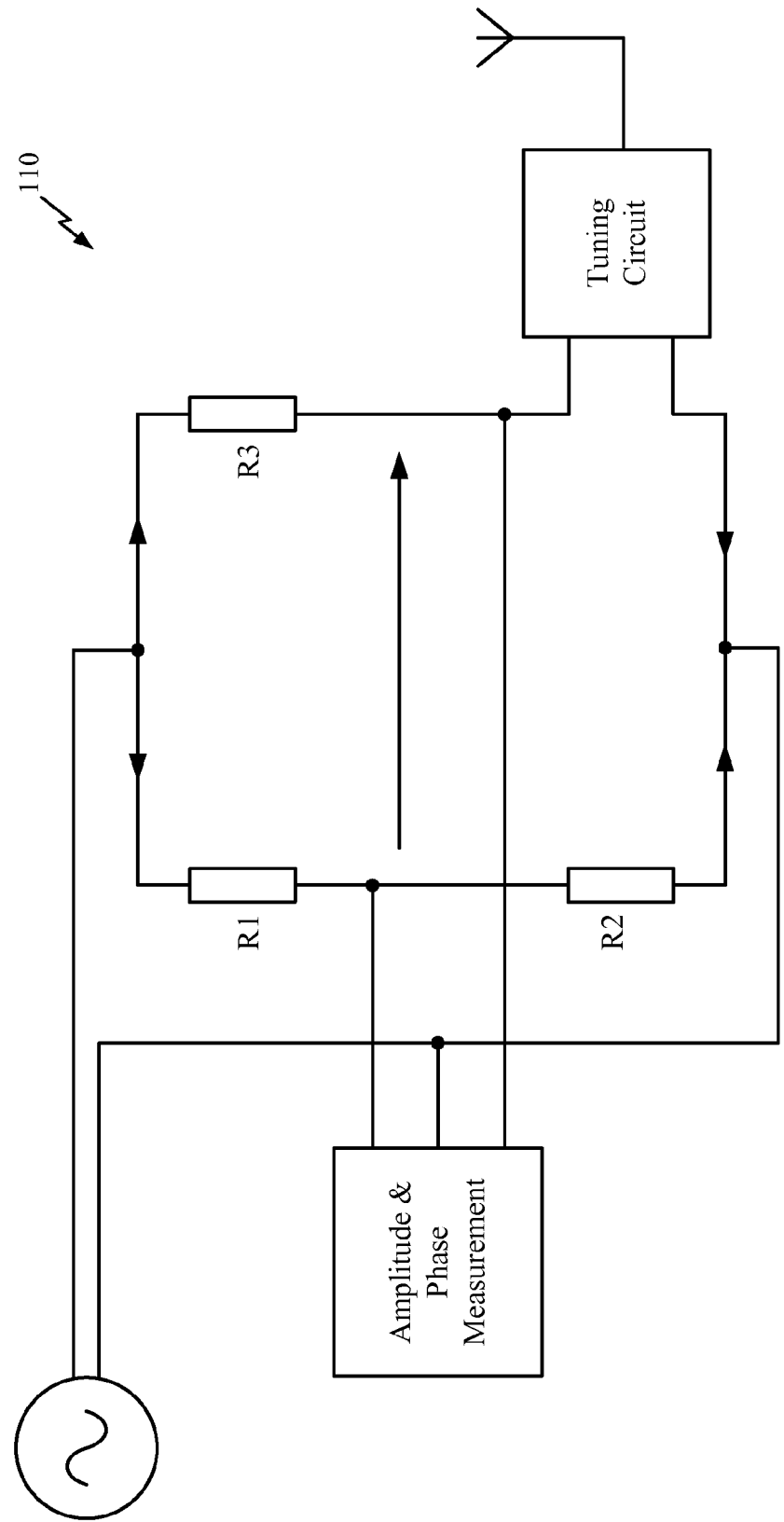
FIG. 3 depicts a conventional impedance measurement bridge.

FIG. 2 illustrates an antenna matching system 110 configured for automatic tuning System 110 includes a measuring circuit 112, a matching circuit 114, a controller 118, and an antenna 116. NFC system 110 may be configured to measure the impedance of the antenna circuitry via a measuring bridge 120, which may comprise a Wheatstone bridge 130 as illustrated in FIG. 3. Wheatstone bridges are well known in the art and, therefore, will not be discussed in detail. Further, with reference again to FIG. 2, matching circuit 114 includes a network of capacitors. Controller 118 may analyze the impedance measurement and control the network of capacitors. As will be appreciated by a person having ordinary skill, automatic tuning devices for long-range RFID readers use large non-integrable components for tuning, which make it difficult for use with mobile NFC transceivers.

Exemplary embodiments of the present invention, as described herein, are related to methods and devices for automatic impedance matching circuitry for NFC antennas. The embodiments described herein may enable for enhanced power transfer to an NFC antenna for various use cases. More specifically, exemplary embodiments may enable for dynamic adjustment of a matching circuit to compensate for variations use conditions, such as antenna inductance, as well as variations of mutual inductance from a handshaking device.

Figure 4:
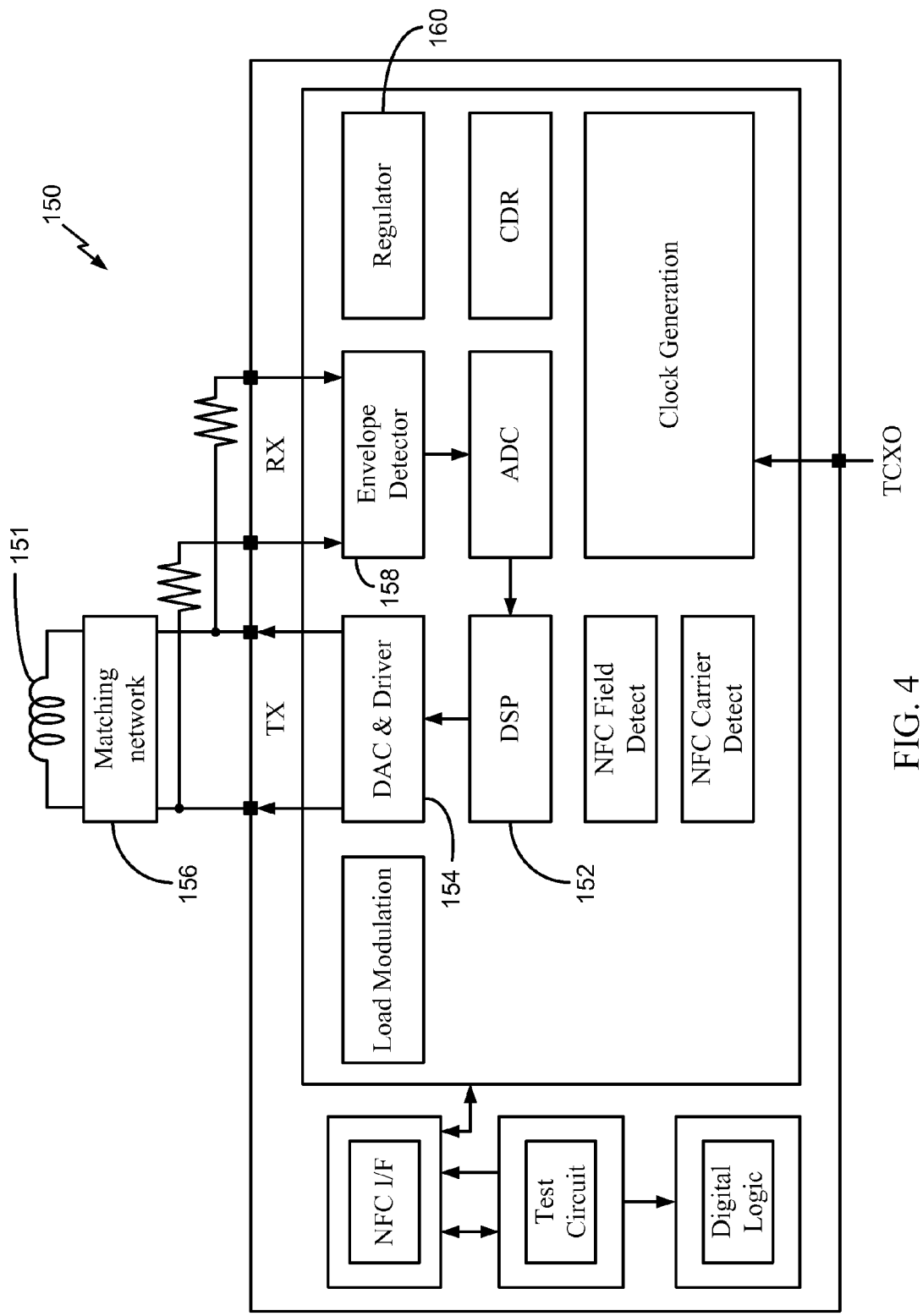
FIG. 4 is a block diagram of an NFC transceiver, in accordance with an exemplary embodiment of the present invention.

FIG. 4 is a block diagram of an NFC transceiver 150, which is configured to support both active and passive modes, as mentioned above. NFC transceiver 150 includes, among other components, an antenna 151, a digital signal processor (DSP) 152, which is also commonly referred to as a baseband modem, a digital-to-analog converter (DAC) & driver module 154, and a matching network 156. It is noted that DAC and driver module 154 may be configured for load modulation and, thus, a separate load modulation module may not be required. NFC transceiver 150 further includes an envelope detector 158 and a regulator 160. Various components of NFC transceiver 150, such as envelope detector 158 and matching network 156, will be discussed more fully below.

Figure 5:
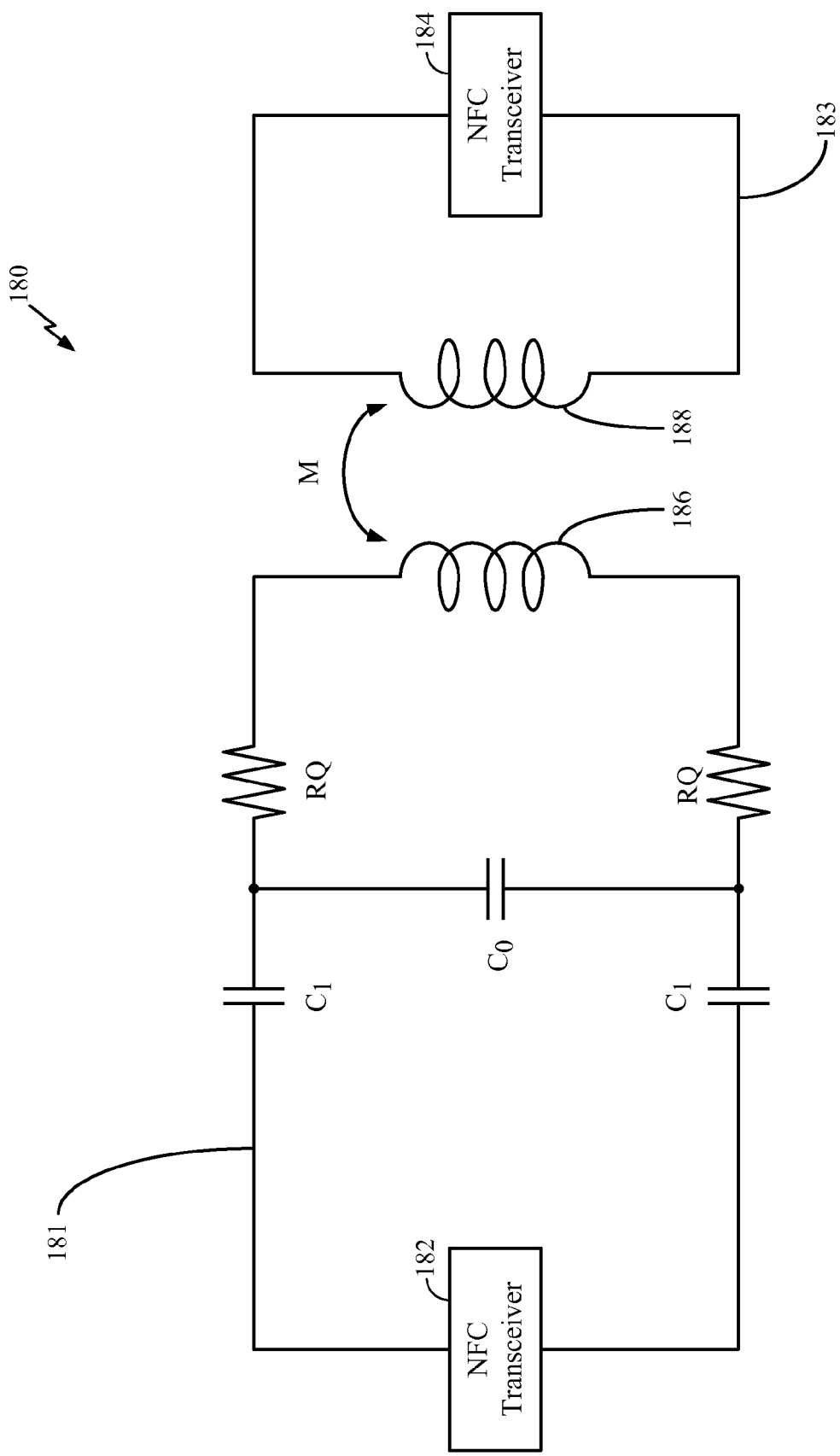
FIG. 5 illustrates an NFC system, according to an exemplary embodiment of the present invention.

FIG. 5 is a circuit diagram of a system 180 including an NFC device 181 that is configured for coupling with another NFC device 183. NFC device 181 includes a matching circuit, which includes capacitors C1 and C0, and an NFC transceiver 182. Further, NFC device 181 includes an antenna 186 and resistors RQ, which are in series with antenna 186. Resistors RQ are utilized for controlling a Q of antenna 186. NFC device 183 includes an NFC transceiver 184 and an antenna 188. It is noted that, although the values of capacitors C0 and C1 may be small, the capacitors should be external to the chip in case they are exposed to a very large voltage. As will be appreciated by a person having ordinary skill, placement of an antenna (e.g., antenna 188) proximate antenna 186 may cause an inductance of antenna 186 to vary. Furthermore, the inductance at antenna 186 may vary depending on the antenna that is placed proximate thereto.

Figure 6:
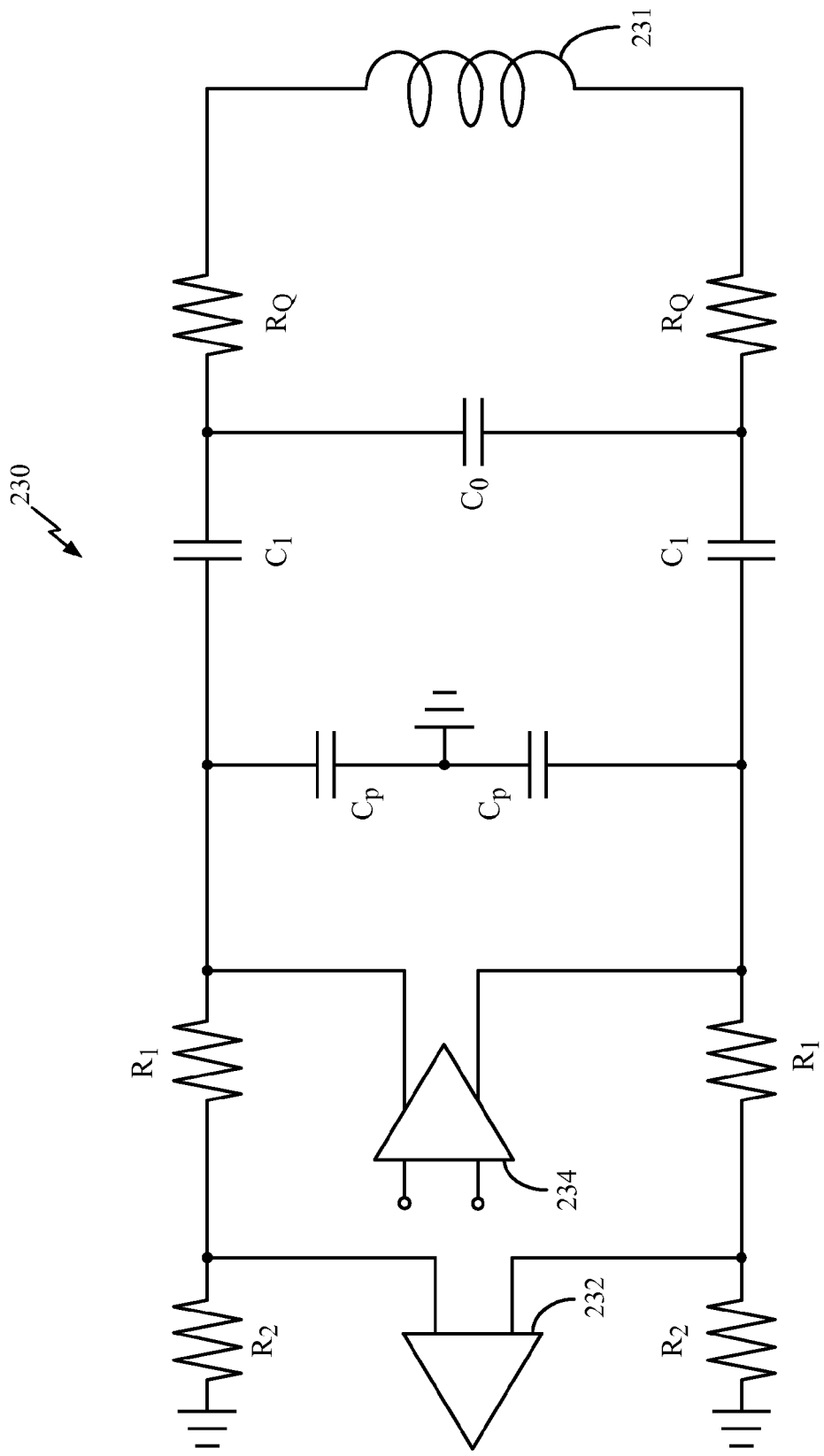
FIG. 6 illustrates an NFC device, according to an exemplary embodiment of the present invention.

FIG. 6 is a circuit diagram of a NFC device 230, in accordance with an exemplary embodiment of the present invention. NFC device 230 includes an antenna 231, resistors $R_Q$, and a matching circuit, which includes adjustable capacitors $C_p$, capacitors $C_1$, and capacitor $C_0$. Resistors $R_Q$ are utilized for controlling a Q of antenna 231. It is noted that adjustable capacitors $C_p$ are coupled in parallel with antenna 231. It is noted that capacitors $C_p$ may be integrated into an associated chip. Moreover, NFC device 230 includes resistors R1, which are external to a chip, and resistors $R_2$, which may be integrated on the chip. Moreover, NFC device 230 includes an envelope detector 232 and an antenna driver 234. Envelope detector 232 has inputs coupled between respective resistors $R_1$ and $R_2$, and antenna driver 234 has outputs coupled to respective resistors $R_1$. As described more fully below, adjustable capacitors $C_p$ may be adjusted via a control module. Further, according to one exemplary embodiment, an output of envelope detector 232 may be coupled to the control module for sensing a voltage output from envelope detector 232. According to another exemplary embodiment, an amplitude of the voltage output from envelope detector may be sensed by envelope detector 232.

It is noted that, according to an exemplary embodiment, if a voltage output from envelope detector 232 is maximized, the amount of power delivered to antenna 232 will also be maximized. As such, embodiments of the present invention include determining a peak voltage at the output of envelope detector 232 via through sweeping a spectrum of capacitor values for capacitor $C_p$. As such, according to an exemplary embodiment of the present invention, capacitor $C_p$ may be continuously adjusted to maximize an amount of power delivered to antenna 231 for a wide range of inductor values.

It is noted that adjustable capacitors $C_p$ may be integrated on chip due to being configured as part of a voltage divider, which reduces an input voltage level. More specifically, an adjustable capacitor $C_p$ and an associated capacitor C1 form a voltage divider and, therefore, a voltage level to which each of adjustable capacitors $C_p$ is exposed may be reduced to an acceptable level.

Figure 7:
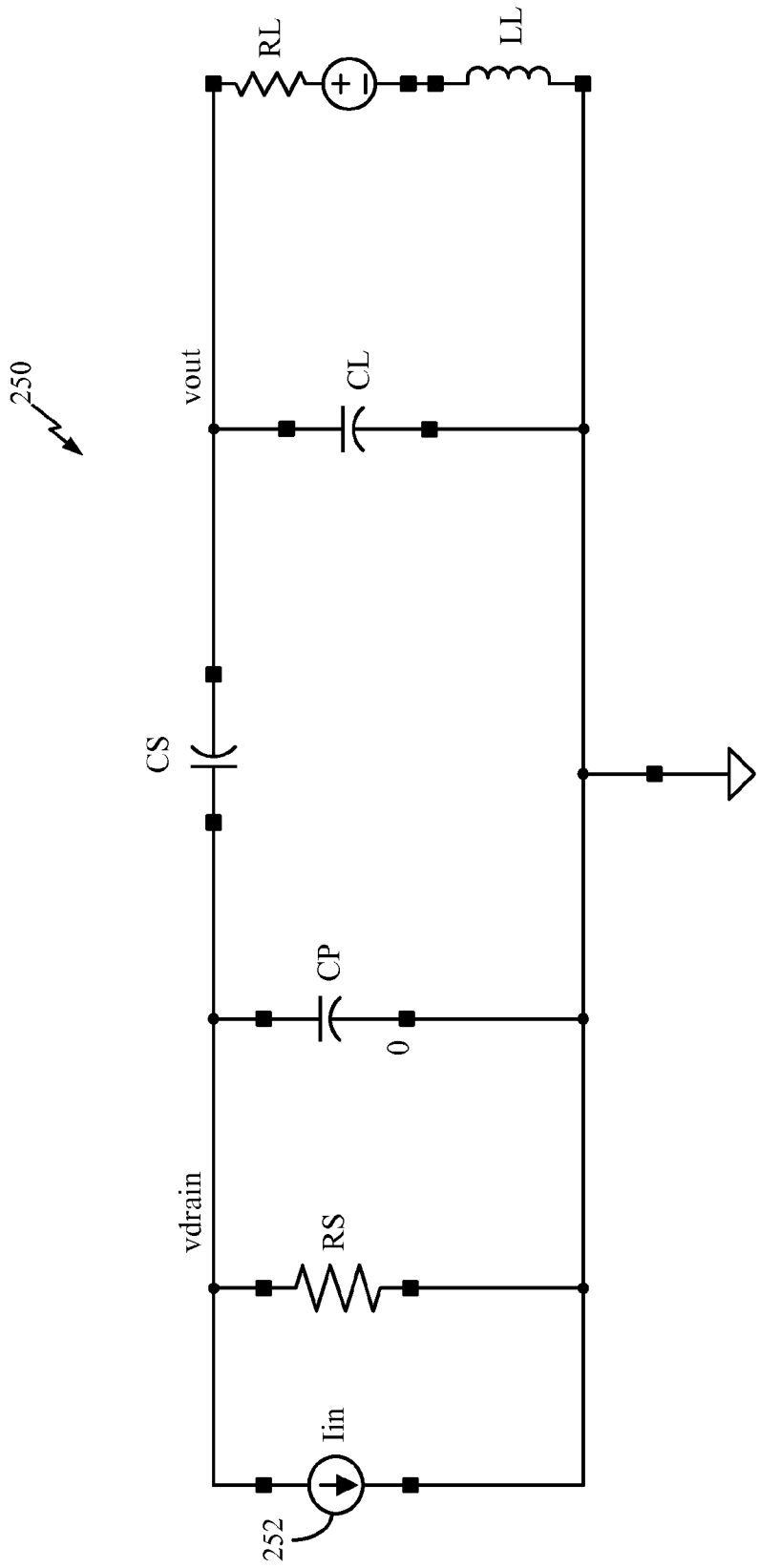
FIG. 7 is a circuit model of a transceiver, antenna, and a matching network, according to an exemplary embodiment of the present invention.
Figure 8A:
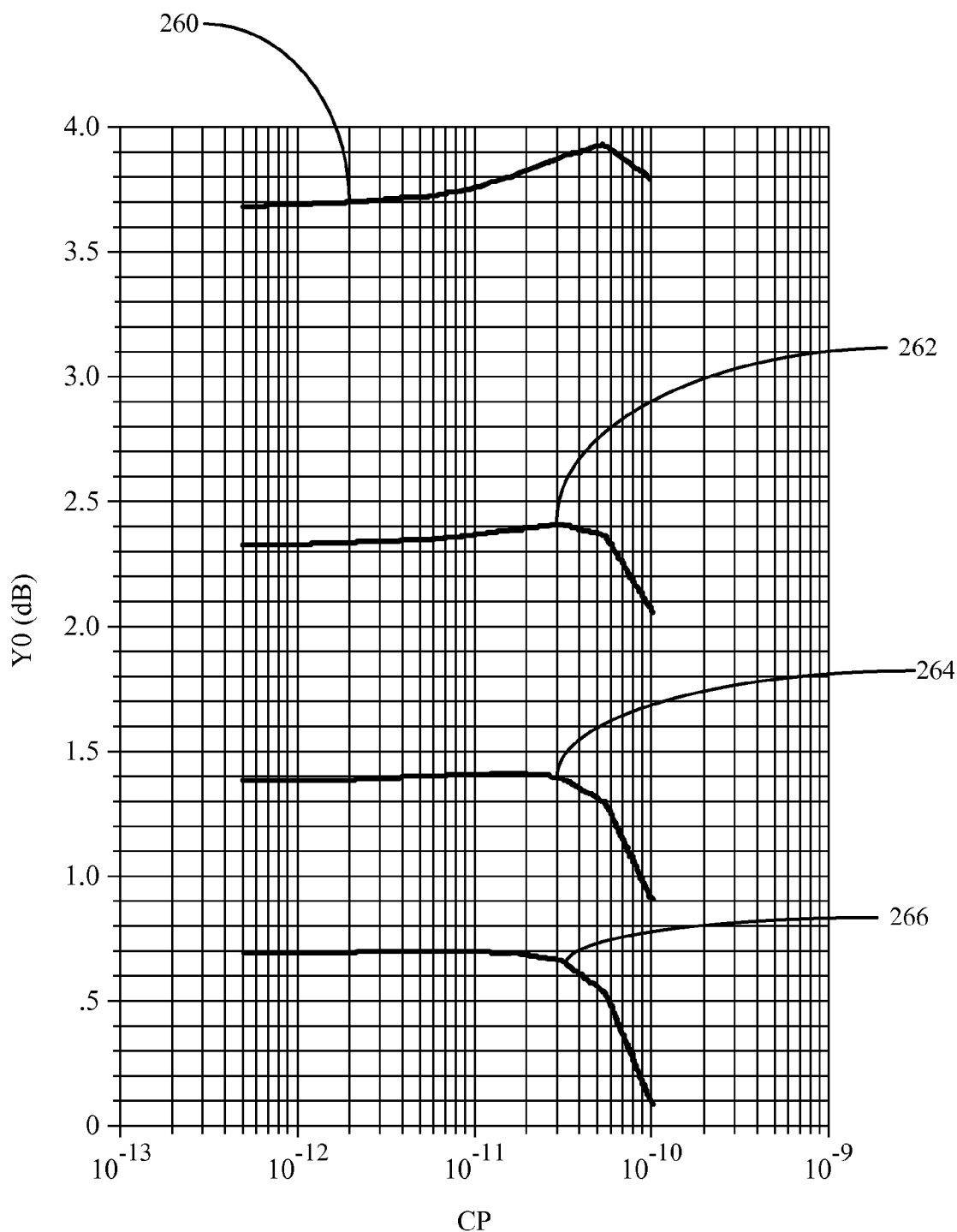
FIG. 8A is a plot illustrating various simulation results of the circuit model illustrated in FIG. 7.
Figure 8B:
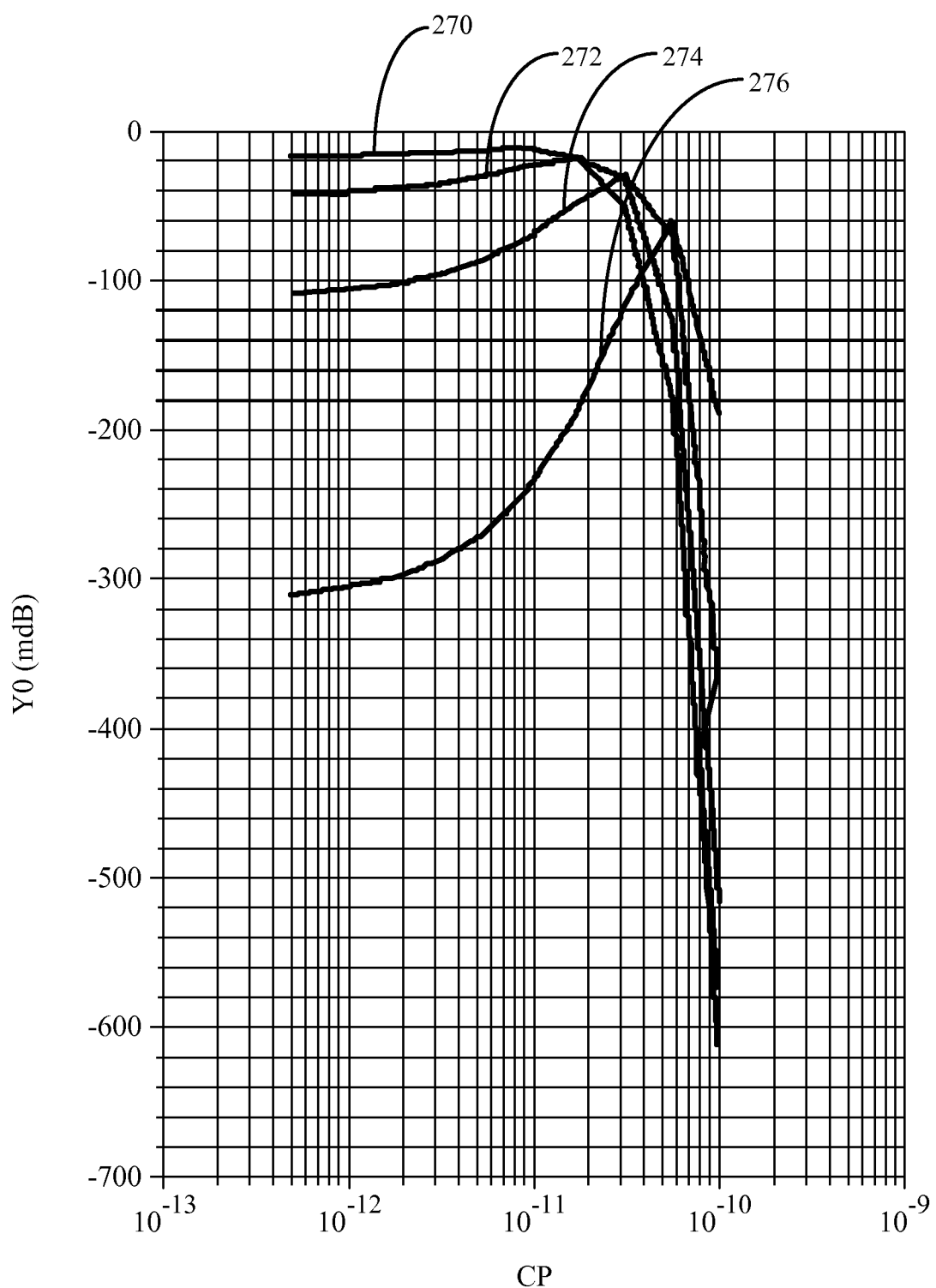
FIG. 8B is another plot illustrating various simulation results of the circuit model illustrated in FIG. 7.
Figure 8C:
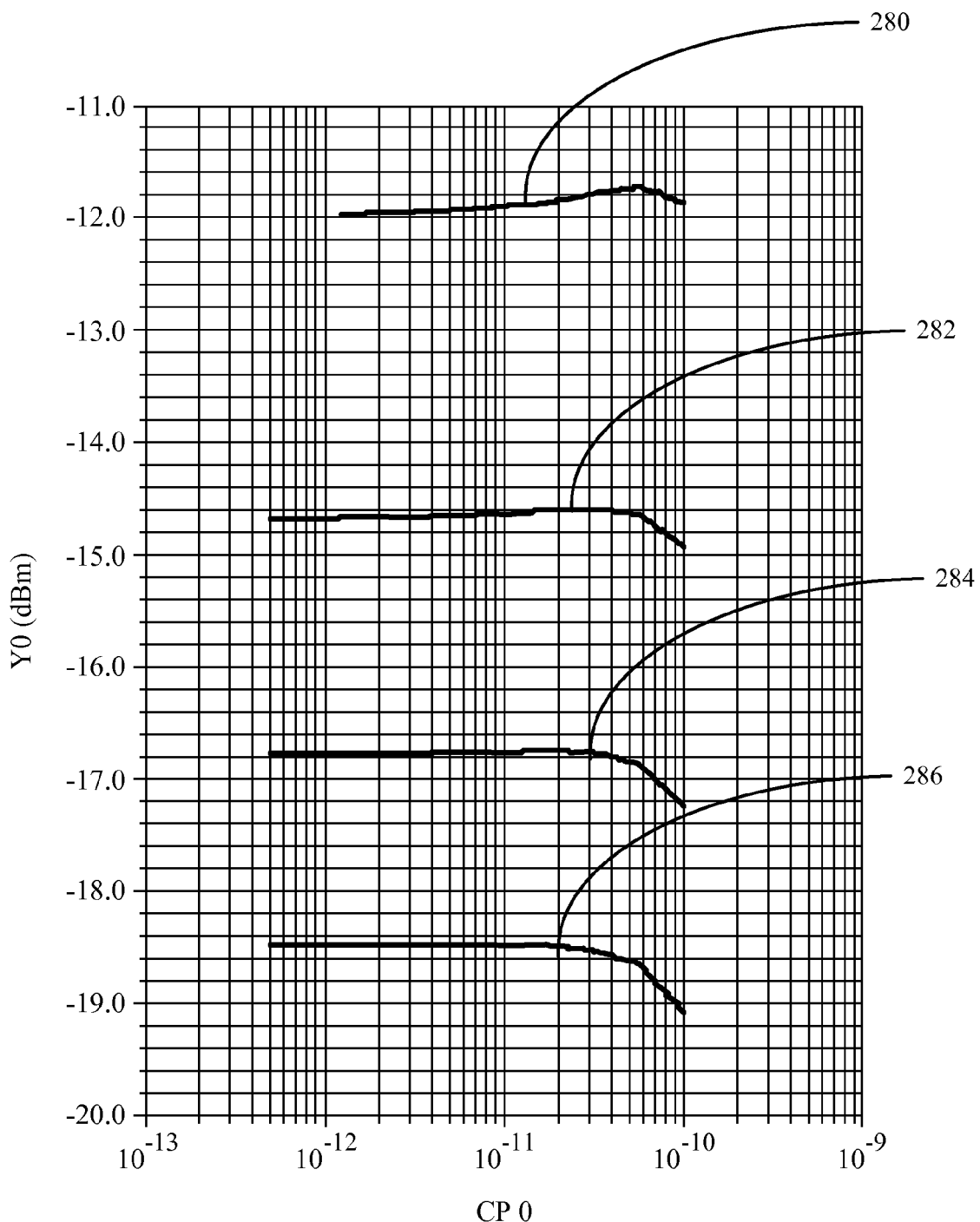
FIG. 8C is yet another plot illustrating various simulation results of the circuit model illustrated in FIG. 7.

FIG. 7 is a circuit diagram model of an NFC device 250, in accordance with an exemplary embodiment of the present invention. FIGS. 8A-8C illustrate simulation results of model 250. NFC device 250 includes an inductor LL, which operates an antenna (e.g., antenna 231), a resistor RL in series with inductor LL, and a matching network including capacitor CL and CS. By way of example only, inductor LL may have an inductance of approximately 2 uH, resistor RL may have a resistance of approximately 1 ohm, capacitor CL may have a capacitance of approximately 50 pF, and capacitor CS may have a capacitance of approximately 100 pF. Model 250 further includes an adjustable capacitor CP, a drive 252, and a resistor RS, which functions as an impedance of drive 252. By way of example only, resistor RS may have a resistance of approximately 50 ohms and the frequency of drive 252 may be approximately 13.5 MHz. In operation, a capacitance value of capacitor CP may be varied for optimal matching, according to an exemplary embodiment of the present invention. According to an exemplary embodiment, when voltage vdrain is maximized, voltage vout will also be maximized. It is noted that a variation of a load of inductor LL may affect the amount of power delivered to inductor LL (i.e., vout). Furthermore, capacitor CP may be varied to observe the effect on the drain voltage.

With specific reference to FIG. 7, voltage vdrain and voltage vout may be determined from current Iin. As a relation between voltage vdrain and voltage vout (i.e., vdrain−vout) is independent of capacitor CP, both their derivatives with respect to capacitor CP become zero at the same value of capacitor CP. Stated another way, both voltage vdrain and voltage vout are maximized at the same capacitance value of capacitor CP. The following equations define the relation ship between voltage vdrain and voltage vout:

$$Vdrain/Vout = 1 + CL/CS + 1/(sCS(RL + sLL)) \quad (1)$$

$$Vout = I_{in} / \left\{ \begin{array}{l} 1/RS(1 + CL/CS) + s(CL + CP + CLCP/CS) + \\ 1/(RL + sL)(1 + CP/CS + 1/sRSCS) \end{array} \right\} \quad (2)$$

wherein s is the frequency.

FIG. 8A is a plot illustrating various simulation results of model 250 illustrated in FIG. 7. More specifically, FIG. 8A depicts a change in voltage vout with respect to capacitance values at varying inductance values. Signal 260 represents a response wherein an inductance value is equal to 1.6 uH, signal 262 represents a response wherein an inductance value is equal to 1.8 uH, signal 264 represents a response wherein an inductance value is equal to 2.1 uH and signal 266 represents a response wherein an inductance value is equal to 2.4 uH.

FIG. 8B is a plot illustrating various simulation results of model 250 illustrated in FIG. 7. More specifically, FIG. 8B depicts a change in voltage vdrain with respect to capacitance values at varying inductance values. Signal 276 represents a response wherein an inductance value is equal to 1.6 uH, signal 274 represents a response wherein an inductance value is equal to 1.8 uH, signal 272 represents a response wherein an inductance value is equal to 2.1 uH and signal 270 represents a response wherein an inductance value is equal to 2.4 uH.

FIG. 8C is a plot illustrating various simulation results of model 250 illustrated in FIG. 7. Specifically, FIG. 8C depicts a change in output power with respect to capacitance values at varying inductance values. Signal 280 represents a response wherein an inductance value is equal to 1.6 uH, signal 282 represents a response wherein an inductance value is equal to 1.8 uH, signal 284 represents a response wherein an inductance value is equal to 2.1 uH and signal 286 represents a response wherein an inductance value is equal to 2.4 uH.

Figure 9:
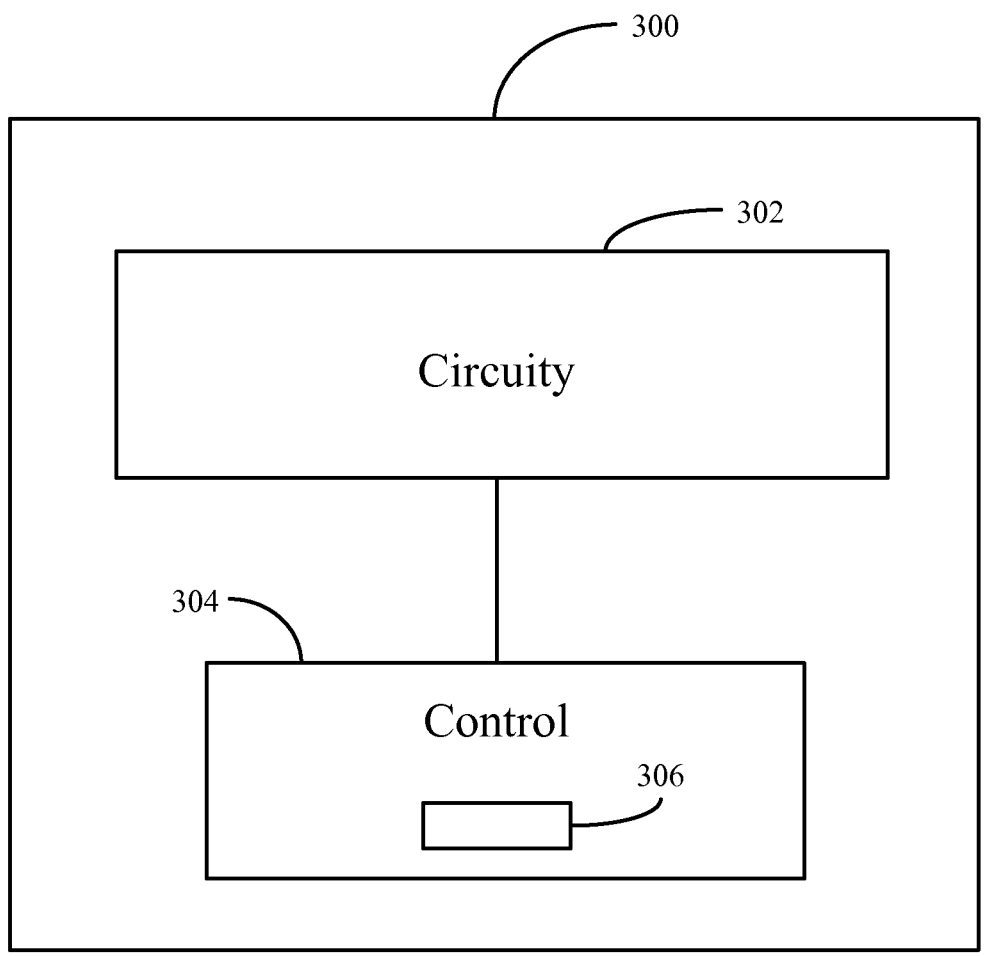
FIG. 9 is a block diagram of a transceiver, in accordance with an exemplary embodiment of the present invention.

FIG. 9 is a block diagram of a NFC transceiver 300, according to an exemplary embodiment of the present invention. NFC transceiver 302 includes circuitry 302, which may comprise circuitry illustrated in FIG. 6 and a control module 304, which may comprise, for example only, a processor, a controller, or the like. Control module 304 may include one or more sensors 306. Control module 304 may be configured to measure a voltage output from circuitry 302 (e.g., envelope detector 232 of FIG. 6). Moreover, control module 304 may be configured to compare a previously measured voltage to a current voltage. Further, control module 207 may be configured to convey one or more control signals to circuitry 302 for controlling a configuration of at least one capacitor therein.

Figure 10:
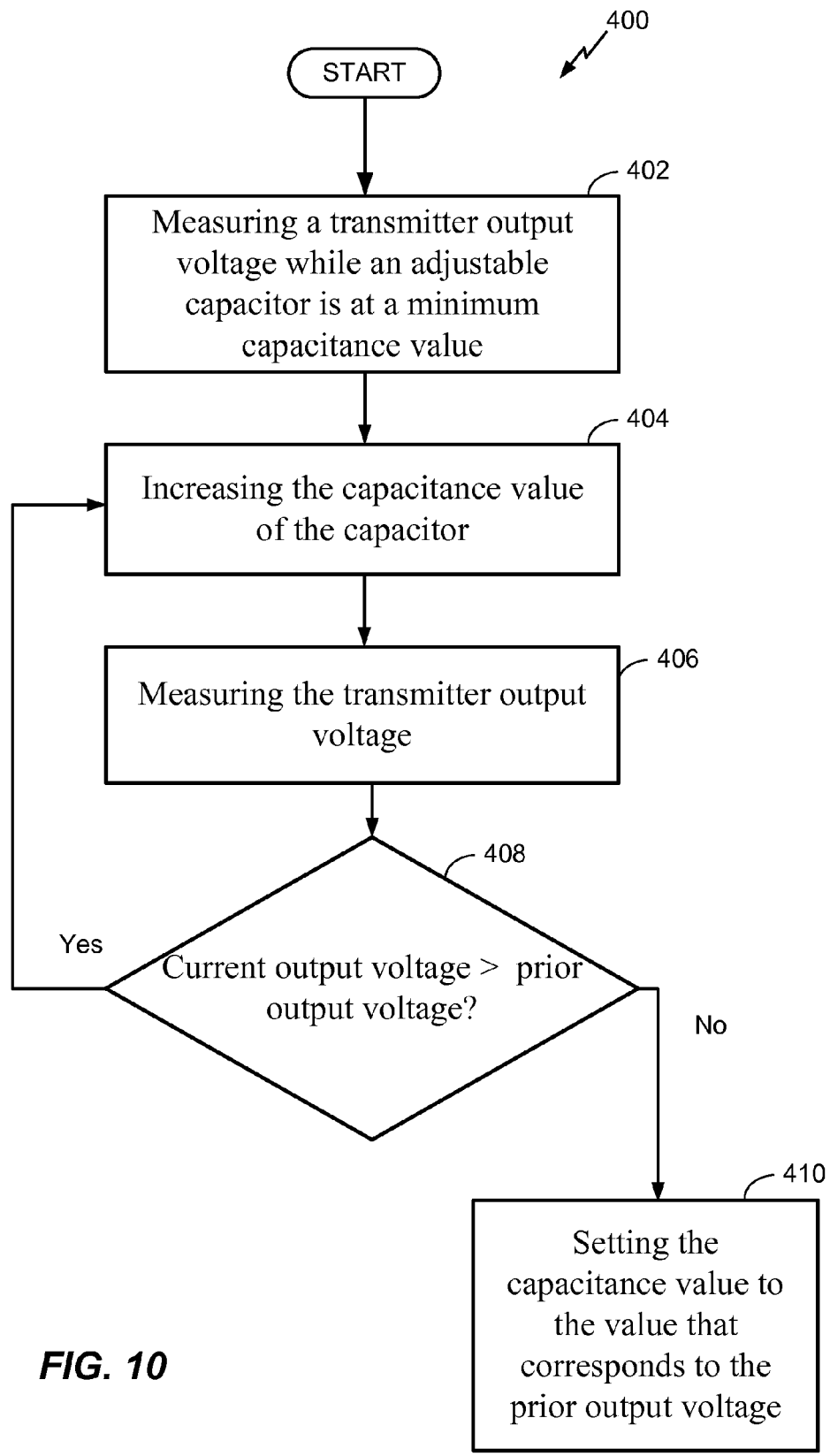
FIG. 10 is a flowchart illustrating a method, according to an exemplary embodiment of the present invention.

FIG. 10 is a flowchart illustrating a method 400, in accordance with one or more exemplary embodiments. Method 450 may include measuring a transmitter output voltage while an adjustable capacitor is set to a minimum capacitance value (depicted by numeral 402). According to one exemplary embodiment, the transmitter output voltage may be measured through an associated receiver envelope detector (e.g., envelope detector 232 of FIG. 6). More specifically, a carrier, such as a 13.56 MHz carrier, may be transmitted through a transmitter and the DC voltage at the output of the envelope detector may be sensed. Method 400 may also include increasing the capacitance value of the adjustable capacitor (depicted by numeral 404). By way of example, the value of the adjustable capacitor may be increased by one least significant bit (LSB). Further, method 400 includes measuring the transmitter output voltage (depicted by numeral 406). It is noted that the transmitter output voltage measured while the capacitance value is set to a minimum value is referred to as a "prior output voltage." In addition, the transmitter output voltage that was measured after the capacitance value of the capacitor has been increased is referred to as a "current output voltage." Method 400 may also include comparing the current output voltage to the prior output voltage (depicted by numeral 408). If the current output voltage is greater than the prior output voltage, method 400 returns to step 404. If the current output voltage is not greater than the prior output voltage, method 400 proceeds to step 410, which includes setting the capacitance value of the adjustable capacitor to the capacitance value that corresponds to the prior output voltage (i.e., the capacitor value from step 402).

Figure 11:
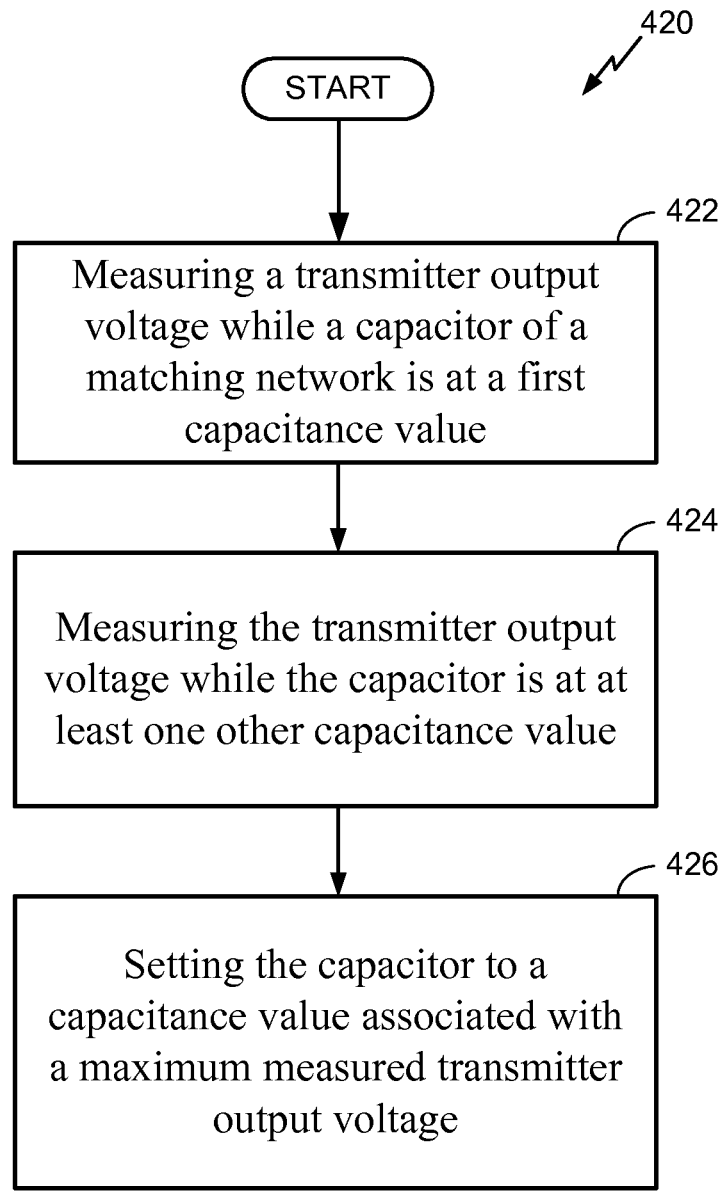
FIG. 11 is a flowchart illustrating another method, according to an exemplary embodiment of the present invention.

FIG. 11 is a flowchart illustrating a method 420, in accordance with one or more exemplary embodiments. Method 420 may include measuring a transmitter output voltage while a capacitor of a matching network is at a first capacitance value (depicted by numeral 422). Method 420 may also include measuring the transmitter output voltage while the capacitor is at at least one other capacitance value (depicted by numeral 424). Further, method 420 setting the capacitor to a capacitance value associated with a maximum measured transmitter output voltage (depicted by numeral 426).

Figure 12:
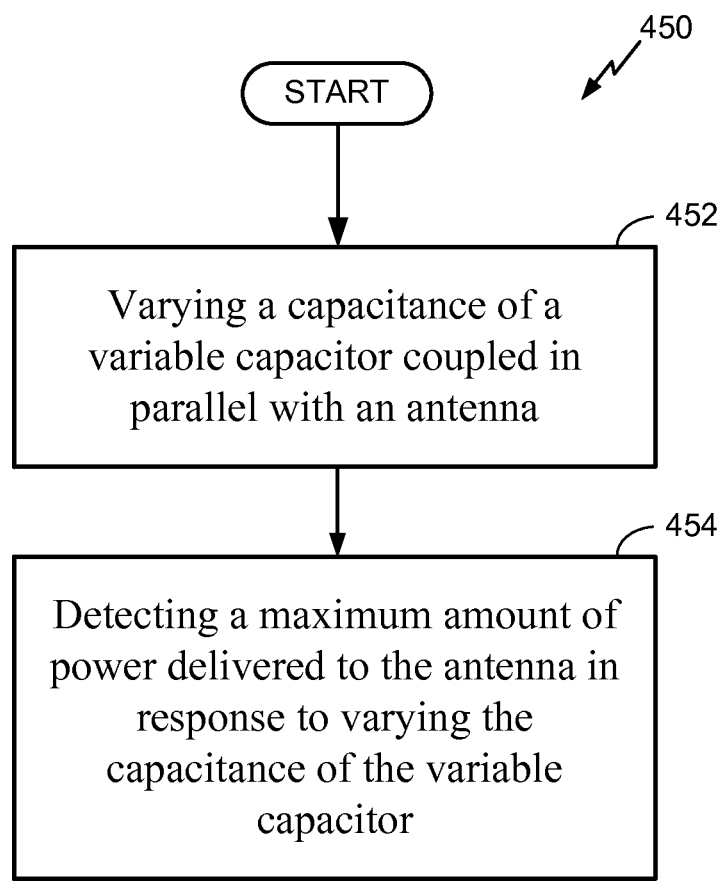
FIG. 12 is a flowchart illustrating yet another method, according to an exemplary embodiment of the present invention.

FIG. 12 is a flowchart illustrating a method 450, in accordance with one or more exemplary embodiments. Method 450 may include varying a capacitance of a variable capacitor coupled in parallel with an antenna (depicted by numeral 452). Method 450 may also include detecting a maximum amount of power delivered to the antenna in response to varying the capacitance of the variable capacitor (depicted by numeral 454).

Exemplary embodiments of the present invention, as described herein may increase an amount of current delivered from a NFC transceiver to an associated antenna by continuously reconfiguring a matching network of the NFC transceiver. Accordingly, the present invention may enable for power reduction and enhance overall functionality of the NFC transceiver.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the exemplary embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the exemplary embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the exemplary embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the exemplary embodiments shown herein but is to be accorded the widest scope consistent with the principles and novel features disclosed herein.

What is claimed is:

1. A transceiver, comprising:
    a matching circuit coupled to a near field communication (NFC) antenna and including first and second adjustable capacitors;
    an envelope detector responsive at least in part to mutual inductance variations in the NFC antenna from an NFC handshaking device, the matching circuit coupled between the envelope detector and the NFC antenna and the matching circuit including a first series capacitor and the first adjustable capacitor in shunt together forming a first voltage divider configured to generate a reduced input signal to a first input of the envelope detector and a second series capacitor and the second adjustable capacitor in shunt together forming a second voltage divider configured to generate a reduced input signal to a second input of the envelope detector; and
    a sensor configured to sense a voltage at an output of the envelope detector and adjust a capacitance of the first and second adjustable capacitors based on a peak voltage at the output of the envelope detector determined by sweeping a spectrum of capacitance values of the first and second adjustable capacitors.

2. The transceiver of claim 1, the envelope detector coupled to the NFC antenna through a resistive network.

3. The transceiver of claim 2, the resistive network comprising a first resistor external to an associated chip and a second resistor integrated on the associated chip.

4. The transceiver of claim 1, further comprising a control module configured to adjust the capacitance of the adjustable capacitor.

5. The transceiver of claim 4, the control module configured to adjust the capacitance of the adjustable capacitor in response to a change in an inductance at the NFC antenna.

6. The transceiver of claim 1, further comprising an antenna driver coupled in parallel with the adjustable capacitor.

7. The transceiver of claim 1, the adjustable capacitor integrated on an associated chip and the series capacitor external to the associated chip.

8. A method, comprising:
measuring a transmitter output voltage while first and second adjustable capacitors of a matching network are respectively at a first capacitance value and a second capacitance value, the matching network coupled between the transmitter output voltage and a near field communication (NFC) antenna coupled to the matching network;
measuring by an envelope detector the transmitter output voltage while the first and second adjustable capacitors are of at least one other capacitance value, the transmitter output voltage responsive at least in part to mutual inductance variations in the NFC antenna from an NFC handshaking device and the matching network including a first series capacitor and the first adjustable capacitor in shunt together forming a first voltage divider configured to generate a reduced input signal to a first input of the envelope detector and a second series capacitor and the second adjustable capacitor in shunt together forming a second voltage divider configured to generate a reduced input signal to a second input of the envelope detector; and
setting the first and second adjustable capacitors to a capacitance value associated with a maximum measured transmitter output voltage based on a peak voltage at an output of the envelope detector determined by sweeping a spectrum of capacitance values of the first and second adjustable capacitors.

9. The method of claim 8, further comprising increasing the capacitance value of the adjustable capacitor after measuring the transmitter output voltage while the adjustable capacitor is at the first capacitance value.

10. The method of claim 9, the increasing comprising increasing the capacitance value of the adjustable capacitor with a control module.

11. The method of claim 8, further comprising comparing the transmitter output voltage associated with the first capacitance value to the transmitter output voltage associated with a second capacitance value.

12. The method of claim 8, the measuring a transmitter output voltage while an adjustable capacitor of a matching network is at a first capacitance value comprising measuring a voltage at the output of the envelope detector.

13. The method of claim 8, the measuring a transmitter output voltage while the adjustable capacitor of a matching network is at at least one other capacitance value comprising measuring a voltage at the output of the envelope detector.

14. The method of claim 8, further comprising increasing the capacitance value if the transmitter output voltage associated with a second capacitance value is greater than the transmitter output voltage associated with the first capacitance value.

15. A device, comprising:
means for measuring a transmitter output voltage while first and second adjustable capacitors of a matching network are respectively at a first capacitance value and a second capacitance value, the matching network coupled between the transmitter output voltage and a near field communication (NFC) antenna coupled to the matching network;
means for measuring by an envelope detector the transmitter output voltage while the first and second adjustable capacitors are of at least one other capacitance value, the transmitter output voltage responsive at least in part to mutual inductance variations in the NFC antenna from an NFC handshaking device and the matching network including a first series capacitor and the first adjustable capacitor in shunt together forming a first voltage divider configured to generate a reduced input signal to a first input of the envelope detector and a second series capacitor and the second adjustable capacitor in shunt together forming a second voltage divider configured to generate a reduced input signal to a second input of the envelope detector; and
means for setting the first and second adjustable capacitors to a capacitance value associated with a maximum measured transmitter output voltage based on a peak voltage at an output of the envelope detector determined by sweeping a spectrum of capacitance values of the first and second adjustable capacitors.

16. The transceiver of claim 1, the first and second adjustable capacitors also coupled in parallel with the NFC antenna.

* * * * *